No. 695,462. Patented Mar. 18, 1902.
J. LEE.
CAN BODY BLANK.
(Application filed Dec. 7, 1900.)
(No Model.)
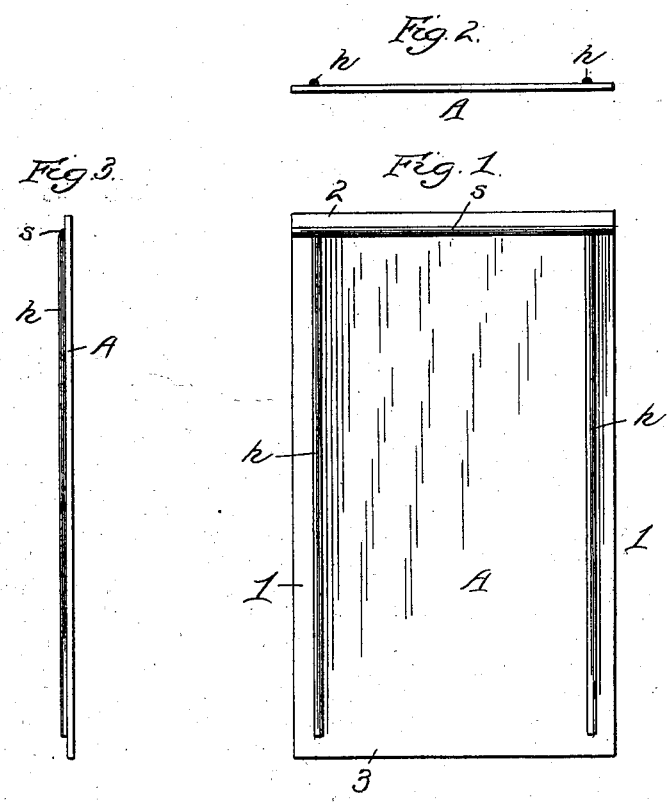
Witnesses:
Edw. L. Reed.
L. B. Middleton
Inventor:
John Lee
by Spear & Suly
Attys

UNITED STATES PATENT OFFICE.

JOHN LEE, OF SAN FRANCISCO, CALIFORNIA.

CAN-BODY BLANK.

SPECIFICATION forming part of Letters Patent No. 695,462, dated March 18, 1902.

Application filed December 7, 1900. Serial No. 39,044. (No model.)

*To all whom it may concern:*

Be it known that I, JOHN LEE, a citizen of the United States, residing at San Francisco, in the county of San Francisco and State of California, have invented certain new and useful Improvements in Can-Body Blanks, of which the following is a specification.

My invention is a body-blank for sheet-metal cans prepared for the subsequent operations of head-soldering or head-soldering and side-seam soldering before being formed into a can-body. My blanks are complete articles of manufacture carrying the solder by means of which the subsequently-formed joints are secured and made air-tight and carrying such solder in such positions that the operations of forming side-seam joints or end-seam joints are not interfered with and can be performed by the aid of machines at present in use for those purposes.

The invention is illustrated in the accompanying drawings, in which—

Figure 1 is a plan view of a sheet-metal body-blank carrying lines or ridges of solder for soldering two end seams and the side seam. Fig. 2 is an end view, and Fig. 3 is a side view, of the same.

A represents a sheet-metal blank of rectangular shape and of proper size to form a tubular can-body of the desired dimensions. The edges 1 1 after the body is formed become members of the joint made with the ends or heads of the can. The edges 2 and 3 are the members of the side-seam joint, which may be either a lock-joint or a lap-joint.

Upon one face of the blank and parallel to an edge 1 is a line or ridge of solder $h$. This line is somewhat removed from the edge, so as to leave a margin of metal entirely free from solder. If the can-body is to be tightly headed at both ends, a similar line of solder lies along the opposite edge of the blank arranged in the same manner. Furthermore, the line or lines $h$ of solder terminate short of the ends 2 3 of the blank, leaving clean metal beyond them, as shown. This keeps the lines $h$ from interfering with the making of the side seam, which is formed by bending the blank and bringing the edges 2 and 3 together with a lock-joint or lap-joint, as may be preferred.

If solder for head-seams only is to be carried by the blank, it is complete at the point and is formed side-seamed and the side seam soldered in any desired or customary manner. If, however, solder for the side seam also is carried by the blank, such solder appears as a line or ridge $s$, extending to and between edges 1 1, parallel to but somewhat removed from edge 2, and hence lying close to the side seam after the latter has been formed. The line or ridge $s$ can extend quite to the edges 1—that is, along the whole side seam. Such ridge is destroyed in the operation of side-seam soldering, which takes place before heading, and hence there is no obstruction to the latter operation.

The solder is applied to the blank in any suitable manner. One method is by passing the blank beneath a flow of melted solder, controlling means being provided to cut off the flow, so as to terminate the solder lines at the proper points. This method is described and illustrated in an application for patent filed by me upon the same day as this present case. Another method is to lay strips of solder of the right length along and upon the blanks in proper positions and cause them to adhere by fusing them. Such a method is described in another application filed by me upon the same date. Whatever method or means may be used the result is a blank carrying the solder for one or all seams in such a manner as not to interfere with the formation of those seams and also carrying exactly the right quantity of solder for any seam, whereby solder is economized and waste prevented.

After the joints or seams have been formed they are soldered by applying heat to the lines of solder, while the joint is held in proper position to cause or allow the fused solder to enter it.

Having thus fully described my invention, what I claim as new, and desire to secure by Letters Patent, is—

1. A sheet-metal blank having a line or ridge of solder extending parallel and in proximity to an edge, but removed from said edge, leaving a seam-section, said seam-section of said blank being entirely free from any solder film or coating.

2. A sheet-metal blank having a plane flat surface, and provided with a plurality of lines or ridges of solder extending each in proximity to an edge, leaving a seam-section, said seam-section of said blank being entirely free from any solder film or coating.

3. A sheet-metal blank having a line or ridge of solder for subsequently soldering an end seam extending parallel to an edge, but removed from, and terminating at both ends short of those edges of the blank at right angles to it, the corners of the blank being free from any solder line or ridge.

4. A sheet-metal blank having a line or ridge of solder, for subsequently soldering a side seam, extending parallel to one edge of the blank but removed therefrom and terminating at both ends at those edges which are at right angles to it, such blank having also one or more lines or ridges of solder, for subsequently soldering an end seam or seams, extending at right angles to the first-mentioned line or ridge and parallel to an edge or edges of the blank, and terminating at both ends short of those edges of the blank which are at right angles to it, or them.

In testimony whereof I have affixed my signature, in presence of two witnesses, this 1st day of December, 1900.

JOHN LEE.

Witnesses:
L. W. SEELY,
F. M. BURT.